(12) United States Patent
Timoney

(10) Patent No.: US 6,264,212 B1
(45) Date of Patent: Jul. 24, 2001

(54) VEHICLE SUSPENSION SYSTEM

(75) Inventor: Sean Timoney, Dublin (IE)

(73) Assignee: Technology Investments Limited, Navan (IE)

( * ) Notice: Subject to any disclaimer, the term of this patent is extended or adjusted under 35 U.S.C. 154(b) by 0 days.

(21) Appl. No.: 09/377,775

(22) Filed: Aug. 2, 1999

(30) Foreign Application Priority Data

Aug. 20, 1998 (IE) .................................................... S980687

(51) Int. Cl.⁷ ............................ B60G 17/01; B60G 23/00
(52) U.S. Cl. .................................. 280/5.51; 280/124.159; 280/124.106; 280/5.508; 701/37; 701/38
(58) Field of Search ..................... 280/124.159, 124.104, 280/124.106, 5.508, 5.51, 5.504, 124.162, 124.161; 701/37, 38; 180/89.12, 89.13; 340/425.5, 429, 440

(56) References Cited

U.S. PATENT DOCUMENTS

| 4,693,493 | | 9/1987 | Ikemoto et al. | 280/5.508 |
| 4,848,790 | * | 7/1989 | Fukunaga et al. | 280/5.504 |
| 4,960,290 | * | 10/1990 | Bose | 280/124.162 |
| 4,976,454 | * | 12/1990 | Bohn | 280/5.504 |
| 5,137,299 | * | 8/1992 | Jones | 280/5.507 |
| 5,217,246 | * | 6/1993 | Williams et al. | 280/5.507 |
| 5,322,319 | * | 6/1994 | Tanaka et al. | 280/5.503 |
| 5,366,236 | * | 11/1994 | Kuriki et al. | 280/5.504 |
| 5,603,387 | * | 2/1997 | Beard et al. | 180/89.12 |
| 5,740,039 | * | 4/1998 | Hirahara et al. | 701/37 |
| 5,899,472 | * | 5/1999 | Burke et al. | 280/124.106 |

FOREIGN PATENT DOCUMENTS 2313346   11/1997  (GB) .

* cited by examiner

Primary Examiner—Lanna Mai
Assistant Examiner—Lynda Jasmin
(74) Attorney, Agent, or Firm—Jacobson, Price, Holman & Stern, PLLC

(57) ABSTRACT

A vehicle suspension system (1) which provides roll control comprises a pair of hydraulic actuators (2, 3) mounted at wheels on opposite sides of the vehicle chassis, each hydraulic actuator (2, 3) being connected between the wheel and the chassis. Each hydraulic actuator (2, 3) has a fluid filled variable volume fluid chamber (8, 9) defined by a cylinder (4, 5) and piston (6, 7), one part being connected to the wheel and the other part to the chassis. An hydraulic accumulator (12, 13) is connected to each fluid chamber via a fluid transfer line (14, 15) to act as a spring with damping means being provided by a flow restrictor orifice (10, 11). A pump (16) communicates via fluid transfer lines (14, 15) between both hydraulic actuator fluid chambers (8, 9) through a control valve (19) which is operable to isolate both chambers (8, 9) from each other and from the pump (16) or to selectively connect one chamber (8, 9) to an inlet (17) of the pump (16) and the other chamber (8, 9) to an outlet of the pump (16). A sensor (21) senses one or more vehicle attitude parameters such as lateral roll and longitudinal pitch of the vehicle. The sensor (21) is connected to a controller (20) having means for regulating operation of the control valve (19) for direct pumping of fluid between the chambers (8, 9) in response to the sensed (21) parameters to counteract one or both of lateral roll and longitudinal pitch of the vehicle.

18 Claims, 4 Drawing Sheets

VEHICLE SUSPENSION SYSTEM

BACKGROUND OF THE INVENTION

This invention relates to a vehicle suspension system.

In order to provide good vehicle ride behaviour, it is well known that a relatively soft vehicle suspension is desirable. A consequence of using soft suspension is that the vehicle roll stiffness is reduced leading to higher roll angles in cornering manoeuvres. Vehicle designers frequently resort to the use of anti-roll bars or similar devices to increase the vehicle roll stiffness. Soft suspension may also result in more severe vehicle pitch oscillations.

In some cases, the use of devices such as anti-roll bars degrade the performance of the suspension system. For example, vehicles designed for good off-road mobility sometimes employ independent suspension with a long wheel travel capability. In this case, the use of an anti-roll bar increases the suspension stiffness, even in the absence of body roll, when the wheels on opposite sides of the vehicle are moving in different directions in response to the terrain, thus reducing the independence of the wheel movements.

In the prior art, Patent Specification No. U.S. Pat. No. 4,693,493 describes a system for vehicle body roll control using steering angle detection. In British Patent Specification No. GB 2313346, there is described a pneumatic anti-roll system for vehicles.

Active control systems have been proposed which counter body roll and pitch in response to signals from sensors that detect body attitude, velocities, or accelerations. An active suspension system typically uses a power source external to the suspension system to drive an hydraulic pump that transfers fluid from a reservoir through a servo valve into a pressurised part of the suspension system. Because the pump must raise the pressure of the hydraulic fluid from reservoir pressure to system pressure, and because of the metering action of the servo valves, such systems often involve a significant power loss. Such systems are also relatively complex and expensive.

The present invention is directed towards overcoming these problems.

SUMMARY OF THE INVENTION

According to the invention, there is provided a suspension system for a pair of spaced-apart wheels on a vehicle, the system comprising:

a spring means and a damping means associated with each wheel and working in parallel such that their forces are additive, a hydraulic actuator mounted in series with the spring means such that the force in the actuator equals either the spring force or the sum of the spring force and damping force, each hydraulic actuator connected between the wheel and a chassis of the vehicle so as to transmit a force from the wheel to the chassis, each hydraulic actuator having a variable volume fluid chamber, said fluid chamber being filled with a substantially incompressible hydraulic fluid, an hydraulic fluid transfer line communicating between the fluid chambers of both hydraulic actuators, a pump mounted in the hydraulic fluid transfer line, said pump having a fluid inlet and a fluid outlet, fluid control valve means associated with the pump mounted in the fluid transfer line, said control valve means being operable to isolate both hydraulic actuator fluid chambers from each other and from the pump or to selectively connect a first hydraulic actuator fluid chamber to an inlet of the pump and connect a second hydraulic actuator fluid chamber to an outlet of the pump, means for sensing at least one vehicle attitude parameter, the sensing means being operatively connected to a controller, said controller having means for regulating operation of the control valve means in response to said sensed vehicle attitude parameter or parameters to counteract one or both of lateral roll and longitudinal pitch of the vehicle.

It will be appreciated that the invention provides a roll and/or pitch control suspension system for a vehicle in which high pressure hydraulic fluid is pumped directly between hydraulic actuators in a controlled manner to counteract sensed roll and/or pitch of the vehicle. This arrangement advantageously helps minimise the power requirement and provides a relatively simple system with a view to minimising manufacturing cost and providing reliability in operation.

In one embodiment, the spring means is an hydraulic accumulator connected to the hydraulic actuator fluid chamber by a fluid line and the damping means is a flow restrictor mounted in the fluid line between the fluid chamber and the accumulator.

In another embodiment, the spring means is a mechanical spring and the damping means is a mechanical damper.

In a further embodiment, the spring means comprises a main piston incorporating a gas chamber and an oil chamber separated by a separator piston, said main piston forming a piston of the hydraulic actuator which slides within a complementary actuator cylinder and the damping means is a flow restrictor between the oil chamber in the main piston and the fluid chamber in the actuator cylinder.

In another embodiment, the hydraulic actuators are mounted at wheels on opposite sides of the vehicle. In a further embodiment, the hydraulic actuators are mounted at wheels on a common axle of the vehicle. In another embodiment the hydraulic actuators are mounted at wheels which are longitudinally spaced apart on the vehicle.

In a further embodiment, the hydraulic actuator is of two part construction comprising a piston slidably mounted in a complementary cylinder to provide the variable volume hydraulic fluid chamber, one part being attached to the wheel and the other part being attached to the vehicle chassis. In another embodiment of the invention, one of said parts has a spring and/or damper mounted between said part and the wheel or chassis.

In a further embodiment, means is provided for adjustment of the quantity of gas within the accumulator or gas chamber.

In another embodiment, means is provided for the gradual adjustment of the quantity of hydraulic fluid in the system.

Preferably, the control valve is a servo valve.

Conveniently, means may be provided for adjusting the quantity of hydraulic fluid in each accumulator.

In a further embodiment, the impedance of each flow restrictor is adjustable.

In another embodiment, the sensing means is operable to sense one or more of the vehicle attitude parameters selected from the group: lateral acceleration, roll angle, roll rate, braking, steering angle, pitch angle or pitch rate. In a further embodiment, the sensing means includes means for sensing the vehicle speed. Preferably, the sensing means includes means for sensing the longitudinal acceleration of the vehicle. Conveniently also, the sensing means includes means for sensing wheel displacement relative to the chassis.

In another embodiment, each hydraulic actuator comprises a forward hydraulic actuator and a rearward hydraulic actuator mounted on a forward axle and a rearward axle on the same side of the vehicle, the fluid chambers of the actuators on each side of the vehicle communicating with a common hydraulic accumulator.

In a further embodiment, each suspension system having the first and second hydraulic actuator mounted at longitudinally spaced-apart wheels on opposite sides of the vehicle.

Conveniently in this arrangement the pair of suspension systems may be interconnected by an equalising valve connected between the fluid transfer lines of the different systems, said equalising valve being operable to allow the slow bleed of hydraulic fluid between the systems in response to a sensed difference in averaged extension of hydraulic actuators in the two systems.

BRIEF DESCRIPTION OF THE DRAWINGS

The invention will be more clearly understood from the following description of some embodiments thereof, given by way of example only, with reference to the accompanying drawings, in which.

DESCRIPTION OF THE PREFERRED EMBODIMENTS

Figure 1:
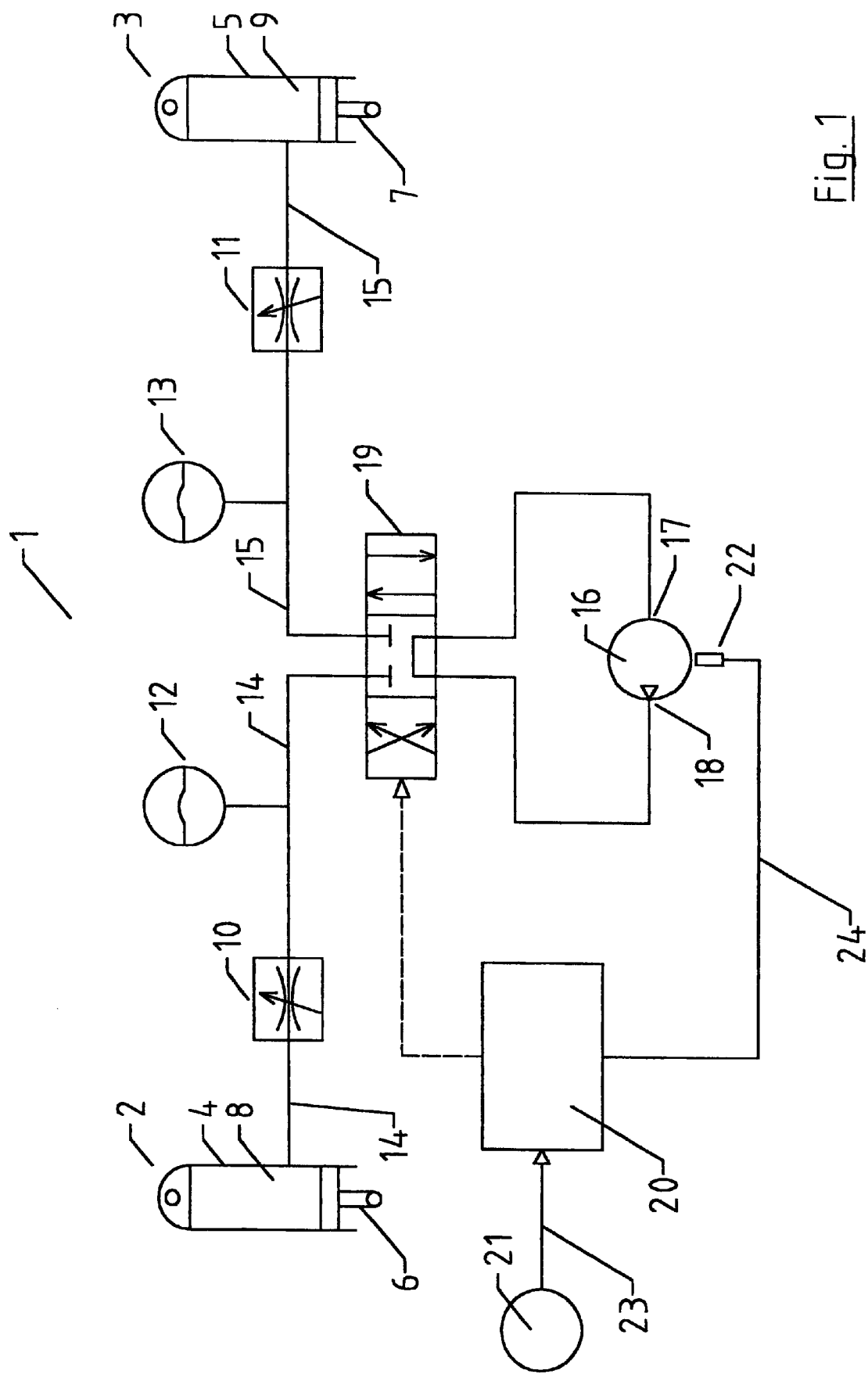
FIG. 1 is a diagrammatic representation of a suspension system according to the invention intended to enhance the roll stiffness of a single axle of a vehicle comprising of two wheels on either side of the vehicle which may be mounted on a substantially rigid axle or may alternately be independently sprung.

Referring to the drawings, and initially to FIG. 1 thereof, there is illustrated a suspension system according to the invention for a vehicle, the suspension system indicated generally by the reference numeral 1.

FIG. 1 shows, on the left side of a vehicle, a hydraulic actuator 2 and on the right side of the vehicle an associated hydraulic actuator 3. Each hydraulic actuator 2, 3 comprises a cylinder 4, 5 and associated piston 6, 7. Either one of the cylinder 4, 5 or the piston 6,7 is connected directly or indirectly to the vehicle chassis while the complementary cylinder 4, 5 or piston 6, 7 is connected directly or indirectly to a road wheel of the vehicle so that, when relative movement occurs between the wheel and the vehicle chassis, hydraulic fluid is displaced from a variable volume fluid chamber 8, 9 of the hydraulic actuator 2, 3 defined by a cylinder 4, 5 and associated piston 6, 7 through a flow restrictor such as an orifice 10, 11 to or from an accumulator 12, 13 associated with each chamber 8, 9 and in fluid communication therewith via fluid transfer lines 14, 15. The accumulator 12, 13 accepts fluid flow from the chamber 8, 9 with a rise in pressure and thus acts as a fluid spring. This may be accomplished by known means such as compression of a piston or membrane against a gas or spring. Mounted on the fluid transfer line 14, 15 between the chamber 8, 9 and the accumulator 12, 13 is a flow restrictor orifice 10, 11 which provides damping to the suspension system.

A pump 16 communicates between the chambers 8, 9 of both hydraulic actuators 2, 3 through a control valve 19 which is operable to isolate both chambers 8, 9 from each other and from the pump 16 (as shown in FIG. 1) or to selectively connect one chamber 8, 9 with an inlet 17 of the pump 16 and at the same time connect the other chamber 8, 9 with an outlet 18 of the pump 16.

Pump 16 may preferably be a fixed displacement pump in which the volume of fluid displaced by the pump 16 is related mainly to the number of revolutions of the pump drive shaft. Alternatively, it may be any other type of pump. The pump 16 has an inlet 17 and an outlet 18. Pump 16 displaces fluid through a three-position control valve 19. When the control valve 19 is centred as is shown in FIG. 1, it allows the fluid to circulate through it from the pump outlet 18 to the pump inlet 17 with minimal pressure drop. When the control valve 19 is displaced to the right (in the drawing, FIG. 1), the pump 16 displaces fluid from the left-hand accumulator 12 to the right hand accumulator 13 through fluid lines 14, 15, thereby decreasing the suspension force on the left side of the vehicle and increasing the force on the right side of the vehicle. If the pump 16 is a fixed displacement pump, the amount of fluid displaced will be approximately proportional to the number of revolutions of the pump 16 which occur while control valve 19 is displaced from its centre position. It is intended to actuate the control valve 19 in this way when the vehicle is steered to the left or alternatively in response to increasing lateral acceleration and roll angle induced in a left-hand turn of the vehicle. If the lateral acceleration becomes approximately constant, control valve 19 is centred. When the acceleration decreases, control valve 19 is displaced to the left in order to return fluid from the right to the left suspension system. During a vehicle right hand turn, the opposite sequence of operation occurs. Thereby the net fluid transferred is varied in accordance with a desired relationship to the lateral acceleration.

A sensor 21 may be any known means of sensing at least one vehicle attitude parameter such as lateral acceleration, roll angle or roll rate of the vehicle for example. Alternatively, sensor 21 may measure steering wheel angle or represent multiple sensors associated with a number of parameters. A controller 20 has as inputs the measurement from sensor 21 or from multiple sensors 21, said attitude parameter sensor inputs being indicated at 23, the position of control valve 19 at any instant, and a measure of the fluid flow through the pump 16, which in the case of a fixed displacement pump, may be a count of the number of revolutions of the pump 16 using a count sensor 22 connected to the controller 20 by communication line 24. This information may be used to determine when control valve 19 should be switched from one position to another. Additional information such as vehicle speed and displacement of each wheel relative to the vehicle chassis may also be used in the control algorithm.

It will be appreciated that a similar system may be employed to control vehicle pitch by transferring fluid between an accumulator associated with a wheel or group of wheels at the rear of the vehicle to an accumulator associated with a wheel or group of wheels at the front of the vehicle in response to sensors that measure one or more suitable parameters such as, for example, longitudinal vehicle acceleration, pitch angle, pitch rate, brake pedal position and/or wheel displacements relative to the chassis.

It will be noted that the pair of wheels with which the hydraulic actuators 2, 3 of FIG. 1 are associated may be on the same axle on different sides of the vehicle as described to provide roll control. Alternatively, the hydraulic actuators 2, 3 may be associated with a front wheel and a rear wheel on the same side of the chassis to provide pitch control. To provide both roll and pitch control the actuators may be arranged in a diagonal configuration on the chassis between forward and rearward wheels on opposite side of the chassis. In this case two such systems would be provided in a cross configuration on the chassis as shown in FIG. 3.

Figure 3:
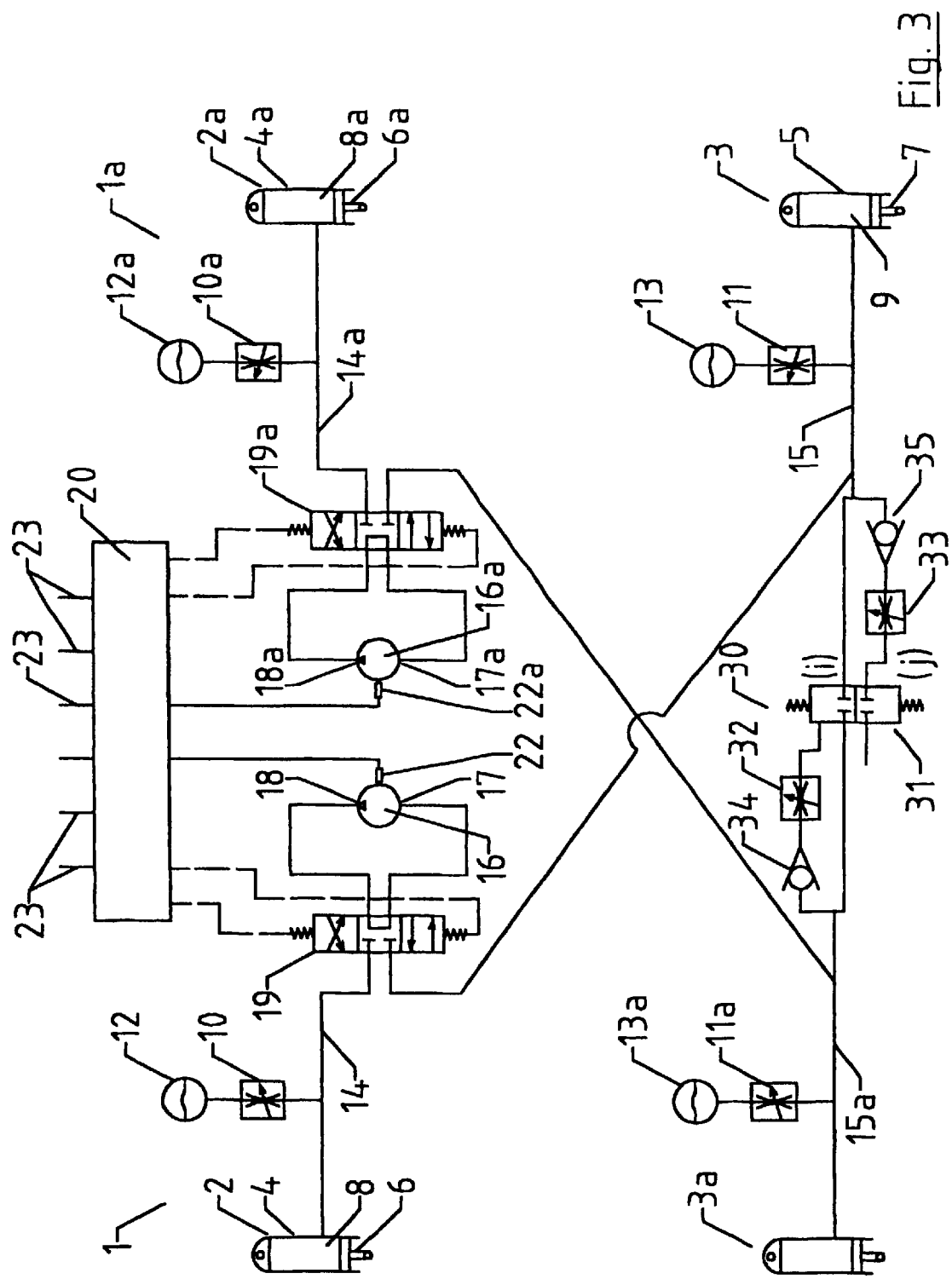
FIG. 3 is a schematic illustration of a pair of suspension systems of the type shown in FIG. 1 arranged for control of both roll and pitch in a vehicle.

FIG. 3 shows an arrangement whereby two of the systems 1 described with reference to FIG. 1 are arranged in a diagonal configuration such that the pairs of hydraulic actuators 2, 3 of each system 1 are mounted between front and rear wheels on opposite sides of the vehicle. Parts similar to those described previously are assigned the same reference numerals. For convenience in distinguishing between the two systems, the letter "a" has been appended to the reference numerals in the second system 1a denoting similar parts to those in the first system 1. Each system 1, 1a can operate independently of the other and as each system 1, 1a connects between front and rear wheels on opposite sides of the vehicle, both roll and pitch control can be achieved using the pair of systems 1, 1a.

Signals from sensors (not shown) which measure the displacement of each wheel relative to the chassis may be averaged in the controller 20 and manipulated to provide switching signals to control valves 19 and 19a for levelling of the vehicle about both transverse and longitudinal axes. Levelling may be assisted by an equalising connection between the pair of otherwise independent systems 1, 1a as indicated generally at 30 in FIG. 3. Equalising valve 31 has two positions (i) and (j). When the averaged extension of hydraulic actuator 3 is greater than the averaged extension of actuator 3a, valve 30 takes position (i) as shown in FIG. 3 allowing a slow bleed of hydraulic fluid from fluid line 15 through a flow restrictor orifice 32 and a non-return valve 34 to fluid line 15a. When the averaged extension of actuator 3 is less than the averaged extension of actuator 3a, the equalising valve 31 is switched to position (j) so that a slow bleed of fluid is allowed from fluid line 15a through a flow restrictor orifice 33 and a non-return valve 35 to fluid line 15.

Figure 2:
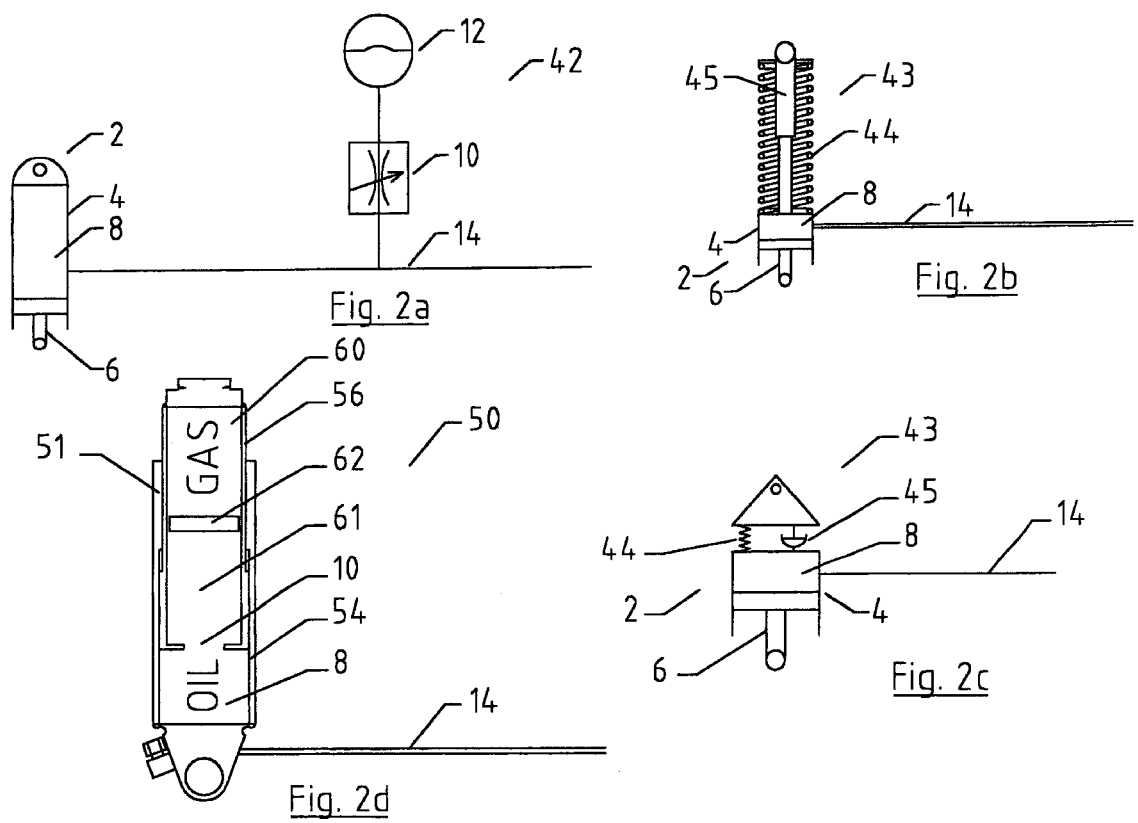
FIGS. 2a, 2b, 2c and 2d are schematic illustrations of portions of other suspension systems according to the invention.

Referring now to FIG. 2(a), there is shown an alternative arrangement 42 to actuator 2, flow restrictor 10, accumulator 12 and fluid line 14 in which the flow restrictor orifice 10 has a different location. FIG. 2(b), FIG. 2(c) and FIG. 2(d) show arrangements 43 and 50 which are functionally equivalent in operation to arrangement 42 shown in FIG. 2(a). In FIG. 2(b), mechanical spring 44 performs the function of accumulator 12 and mechanical damper 45 performs the function of flow restrictor orifice 10. FIG. 2(c) is a schematic representation of the arrangement 43 shown in FIG. 2(b). In FIG. 2(c), accumulator 12 is replaced by a piston 56 in an hydraulic strut 51. Piston 56 has a gas chamber 60 and an oil chamber 61 separated by a separator piston 62. Piston 56 moves through cylinder 54 varying the volume of hydraulic fluid chamber 8. Flow restrictor orifice 10 throttles the flow between hydraulic fluid chamber 8 and oil chamber 61. In FIGS. 2(a), 2(b) and 2(c), fluid line 14 connects via three position control valve 19 to the rest of the suspension system as shown in FIG. 1.

Figure 4:
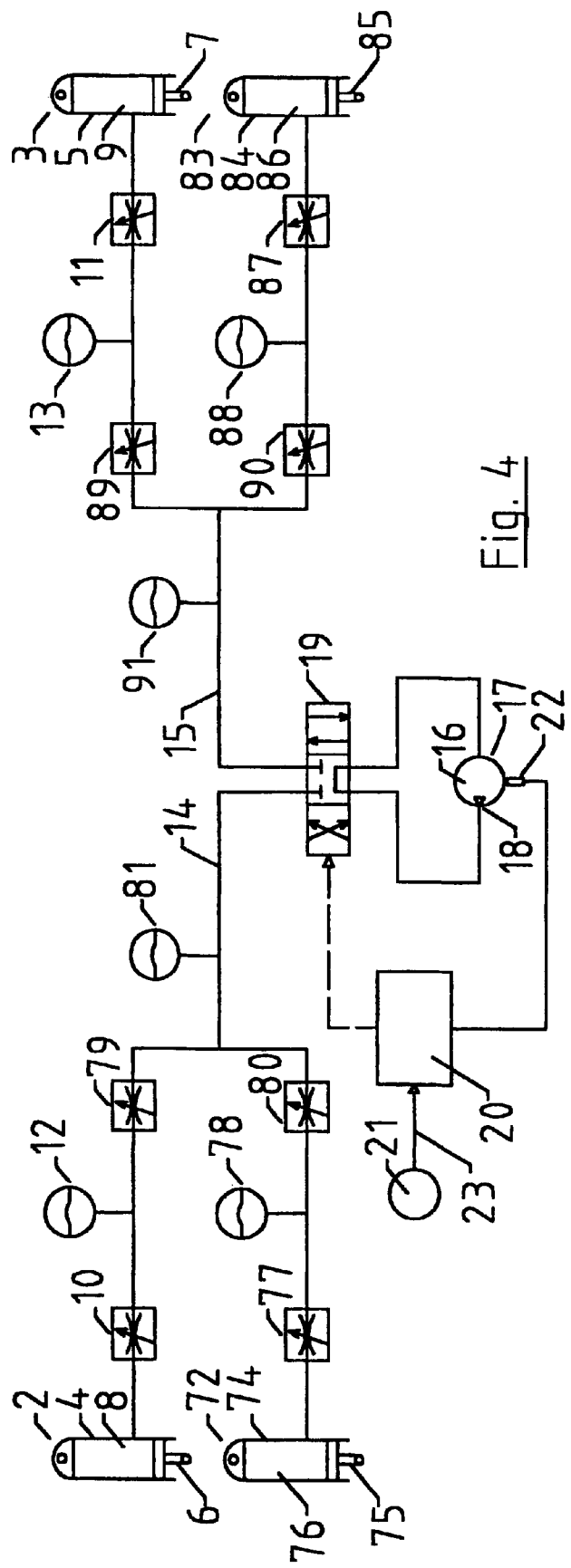
FIG. 4 is a diagrammatic representation of another suspension system according to the invention intended to enhance the roll stiffness of two or more linked axles of a vehicle.

Another embodiment of the invention is shown diagrammatically in FIG. 4 which shows a bogie arrangement suitable for a group of two interconnected axles for the front or rear of a six or eight wheeled vehicle. Parts similar to those described previously are assigned the same reference numerals. FIG. 4 shows, on the left side of the vehicle, a front hydraulic actuator 2 assembly as previously described on a forward axle and a similar associated rear hydraulic actuator 72 on a rearward axle. The second hydraulic actuator 72 comprises a cylinder 74 and a piston 75. Either one of the cylinder 74 or the piston 75 is connected directly or indirectly to the vehicle chassis while the other is connected directly or indirectly to a road wheel of the vehicle so that, when relative movement occurs between the wheel and the vehicle chassis, hydraulic fluid is displaced from a fluid chamber 76 of the hydraulic actuator 72 through a flow restrictor orifice 77 to or from an accumulator 78.

Accumulators 12 and 78 are connected through flow restrictor orifices 79 and 80 respectively to a left common accumulator 81 which in turn connects with the three way control valve 19. On the right side of the vehicle a similar arrangement of forward hydraulic actuator 3 and rearward hydraulic actuator 83 is provided. The rearward hydraulic actuator 83 has a cylinder 84 with complementary piston 85 defining variable volume fluid chamber 86 as previously described. The fluid chamber 86 connects through flow restrictor orifice 87 with accumulator 88. Accumulators 13, 88 of the right forward hydraulic actuator 3 and right rearward hydraulic actuator 83 are connected through flow restrictor orifices 89, 90 to a right common accumulator 91 which in turn connects with the three way control valve 19.

As previously described, the pump 16 is operable to displace fluid through the three-position control valve 19. When the control valve 19 is centred, it allows the fluid to circulate through the control valve 19 from the pump outlet 18 to the pump inlet 17 with minimal pressure drop. When the control valve 19 is displaced to the right (in FIG. 4), the pump 16 displaces fluid from the left-hand common accumulator 81 to the right hand common accumulator 91 through flow lines 14, 15, thereby decreasing the suspension force on the left side of the vehicle and increasing the force on the right side of the vehicle. It the pump 16 is a fixed displacement pump, the amount of fluid displaced will be approximately proportional to the number of revolutions of the pump 16 which occur while control valve 19 is displaced from its centre position. It is intended to actuate control valve 19 in this way when the vehicle is steered to the left or alternatively in response to increasing lateral acceleration and roll angle induced in a left-hand turn of the vehicle. If the lateral acceleration becomes approximately constant, control valve 19 is centred. When the acceleration decreases, control valve 19 is displaced to the left in order to return fluid from the right to the left suspension system. Thereby, the net fluid transferred is varied in accordance with a desired relationship to the lateral acceleration.

Sensor 21 may be any known means of sensing lateral acceleration, roll angle or roll rate of the vehicle.

Alternatively, sensor 21 may measure steering wheel angle or represent multiple sensors. Controller 20 has as inputs the measurement from sensor 21, the position of control valve 19 at any instant, and a measure of the fluid flow through the pump 16, which in the case of a fixed displacement pump 16, may be a count of the number of revolutions of the pump 16 using a count sensor 22. This information may be used to determine when control valve 19 should be switched from one position to another. Additional information such as vehicle speed and/or the displacement of each wheel relative to the chassis may also be used in the control algorithm. In a right hand turn, the opposite sequence of operation occurs.

Figure 5A:
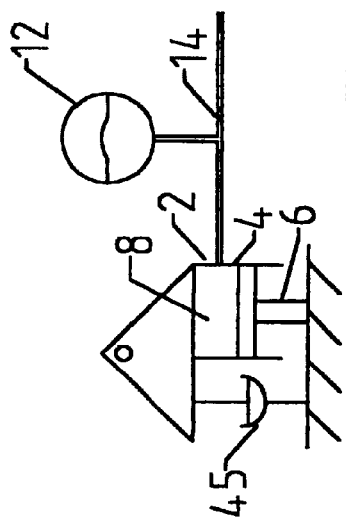
FIGS. 5a and 5b are schematic illustrations of portions of further suspension systems of the invention.
Figure 5B:
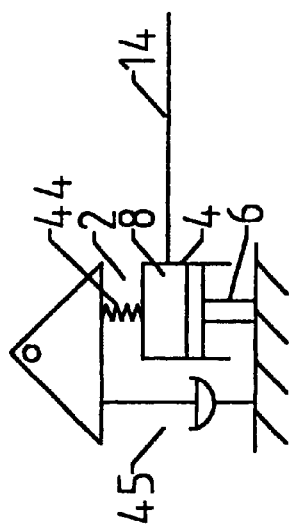

FIGS. 5a and 5b show schematically other arrangements for mounting the hydraulic actuator 2, 3 between the wheel and chassis of a vehicle. Parts similar to those described previously are assigned the same reference numerals. In these cases, a mechanical damper 45 is mounted in parallel with the hydraulic actuator 2 between wheel and chassis.

A fluid transfer pump can be provided with any suitable power source. For example, it could be coupled to the engine of the vehicle, or possibly be driven by an electric motor powered by the vehicle's electrical system.

In any embodiment of the invention, provision may be made for the gradual adjustment of the quantity of hydraulic fluid in the system to compensate for changes in the static loading of the vehicle. The quantity of gas in the accumulators and the impedance of the flow restrictors may also be adjustable during set-up of the vehicle for specific missions, or to allow for changes in the static load of the vehicle.

It will be appreciated that in order to resist vehicle pitch oscillations, wheels or groups of wheels longitudinally displaced from each other may be linked together in a similar way.

It will also be appreciated that the invention overcomes the problems associated with known suspension systems by (in the case of roll control):

1. ensuring that the suspension system characteristics are altered mainly in response to lateral acceleration and roll angle of the vehicle and not directly in response to differential movement of the wheels relative to the vehicle body on either side of the vehicle (unlike an anti-roll bar device)

2. minimising the power losses and complexity of the system by using a hydraulic pump to transfer fluid directly from a pressurised part of the suspension on one side of the vehicle to a pressurised part of the suspension on the other side preferably through a fully open three position control valve.

In the case of pitch control, similar advantages may be gained. Both pitch and roll control can be achieved by pairing two such systems disposed diagonally across the vehicle.

The invention is not limited to the embodiments hereinbefore described which may be varied in construction and detail within the scope of the appended claims.

What is claimed is:

1. A suspension system for a pair of spaced-apart wheels on a vehicle, the system comprising:
   a spring means and a damping means associated with each wheel and working in parallel such that their forces are additive,
   a hydraulic actuator mounted in series with the spring means such that the force in the actuator equals either the spring force or the sum of the spring force and damping force,
   each hydraulic actuator connected between the wheel and a chassis of the vehicle so as to transmit a force from the wheel to the chassis,
   each hydraulic actuator having a variable volume fluid chamber, said fluid chamber being filled with a substantially incompressible hydraulic fluid,
   an hydraulic fluid transfer line communicating between the fluid chambers of both hydraulic actuators,
   a pump mounted in the hydraulic fluid transfer line, said pump having a fluid inlet and a fluid outlet,
   fluid control valve means associated with the pump mounted in the fluid transfer line,
   said control valve means being operable to isolate both hydraulic actuator fluid chambers from each other and from the pump or to selectively connect a first hydraulic actuator fluid chamber to an inlet of the pump and connect a second hydraulic actuator fluid chamber to an outlet of the pump,
   means for sensing at least one vehicle attitude parameter, the sensing means being operatively connected to a controller,
   said controller having means for regulating operation of the control valve means in response to said sensed vehicle attitude parameter or parameters to counteract one or both of lateral roll and longitudinal pitch of the vehicle.

2. A suspension system as claimed in claim 1, wherein the spring means is an hydraulic accumulator connected to the hydraulic actuator fluid chamber by a fluid line and the damping means is a flow restrictor mounted in the fluid line between the fluid chamber and the accumulator.

3. A suspension system as claimed in claim 1, wherein the spring means is a mechanical spring and the damping means is a mechanical damper.

4. A suspension system as claimed in claim 1, wherein the spring means comprises a main piston incorporating a gas chamber and an oil chamber separated by a separator piston, said main piston forming a piston of the hydraulic actuator which slides within a complementary actuator cylinder and the damping means is a flow restrictor between the oil chamber in the main piston and the fluid chamber in the actuator cylinder.

5. A suspension system as claimed in claim 4 wherein means is provided for adjustment of the quantity of gas within the accumulator or gas chamber.

6. A suspension system as claimed in claim 1 wherein the hydraulic actuators are mounted at wheels on opposite sides of the vehicle.

7. A suspension system as claimed in claim 6 wherein the hydraulic actuators are mounted at wheels on a common axle of the vehicle.

8. A suspension system as claimed in claim 1 wherein the hydraulic actuators are mounted at wheels which are longitudinally spaced-apart on the vehicle.

9. A suspension system as claimed in claim 1 wherein the hydraulic actuator is of two part construction comprising a piston slidably mounted in a complementary cylinder to provide the variable volume hydraulic fluid chamber, one part being attached to the wheel and the other part being attached to the vehicle chassis.

10. A suspension system as claimed in claim 9 wherein one of said parts has a spring and/or damper mounted between said part and the wheel or chassis.

11. A suspension system as claimed in claim 1 wherein means is provided for the gradual adjustment of the quantity of hydraulic fluid in the system.

12. A suspension system as claimed in claim 1 wherein the control valve is a servo valve.

13. A suspension system as claimed in claim 1 wherein means is provided for adjusting the quantity of hydraulic fluid in each accumulator.

14. A suspension system as claimed in claim 1 wherein the impedance of each flow restrictor is adjustable.

15. A suspension system as claimed in claim 1 wherein the sensing means is operable to sense one or more of the vehicle attitude parameters selected from the group: lateral acceleration, roll angle, roll rate, braking, steering angle, pitch angle or pitch rate, vehicle speed, longitudinal acceleration and wheel displacement relative to the chassis.

16. A suspension system as claimed in claim 1, wherein each hydraulic actuator comprises a forward hydraulic actuator and a rearward hydraulic actuator mounted on a forward axle and a rearward axle on the same side of the vehicle, the fluid chambers of the actuators on each side of the vehicle communicating with a common hydraulic accumulator.

17. A pair of suspension systems as claimed in claim 1, each suspension system having the first and second hydraulic actuator mounted at longitudinally spaced-apart wheels on opposite sides of the vehicle.

18. A suspension system as claimed in claim 17 wherein the pair of suspension systems are interconnected by a an equalising valve connected between the fluid transfer lines, said equalising valve being operable to allow the slow bleed of hydraulic fluid between the systems in response to a sensed difference in averaged extension of hydraulic actuators in the two systems.

* * * * *